United States Patent Office 2,801,944
Patented Aug. 6, 1957

2,801,944

METHOD OF SOLDERING AND FLUX THEREFOR

Robert Muir, Riverton, N. J., and Ludwig K. Schuster, Philadelphia, Pa., assignors to Heintz Manufacturing Company, Philadelphia, Pa., a corporation of Pennsylvania No Drawing. Application April 1, 1954, Serial No. 420,458

5 Claims. (Cl. 148—26)

This invention relates to the soldering of evaporator tubes such as are used in evaporators, cooling units, air conditioners and the like.

More particularly, this invention is directed to the type of liquid flux which is used in the soldering operation in which the tubes of an evaporator are joined together.

The tubes of cooling units such as evaporators and air conditioners are filled with a refrigerant so that upon the refrigerant being allowed to expand in the evaporator tubes thereof from a highly compressed state, a cooling effect is had. The tubes of such cooling units must be free of moisture before they are charged with refrigerant, for any excess of moisture hampers seriously the functioning of the refrigeration unit, and it may cause decomposition of the refrigerant and corrosion of the tubes.

The refrigerants most commonly used today are fluorinated hydrocarbons such as $CCl_3F$, $CCl_2F_2$, or $C_2Cl_3F_3$, which are known under the trade name "Freon." However, "Freon" will decompose if an excess of moisture is present in the evaporator tubes, which is, of course, an undesirable effect.

The soldering of evaporator tubes is typically accomplished using silver brazing alloys, for instance, consisting of 45% silver, 15% copper, 16% zinc, and 24% cadmium. The fluxes commonly used are the usual kind of aqueous fluxes (that is fluxes containing up to 60 to 70% water), containing borax, fluoride, chloride, etc. These fluxes are usually obtained and used in the liquid or semi-liquid form, and can have either an organic or inorganic base. The inorganic salt fluorine and chlorine and pyroboric acid are satisfactory flux bases. When using this aqueous flux, contamination of the interior of the evaporator tubes with moisture is almost unavoidable.

It has been found that a considerable source of excess moisture in evaporator tubes is the water contained in the liquid flux that is used during the operation in which the tubes are soldered or welded to the evaporator. Water emanating from the liquid flux tends to collect in the evaporator tubes, to be trapped therein when the tubes are soldered closed.

According to the present invention, the moisture content in evaporator tubes can be minimized by using an improved liquid flux, one that contains "Freon" as part of the fluid of the liquid flux. It is therefore an object of the present invention to improve the technique of soldering evaporator tubes by employing an improved liquid flux that contains a given amount of "Freon."

Since it has been known that the liquid flux used during the soldering operation was the source of much of the moisture that collected in evaporator tubes, it was first proposed that a dry flux be used, such as borax or a fluoride contining a solvent. However, a dry flux was not found to be satisfactory from the standpoint of time involved for its application, and other standpoints. It was, therefore, decided that a liquid flux, preferably containing boric acid as a principal ingredient, must be used for the soldering of evaporator tubes.

When using a liquid flux, inasmuch as the flux is typically applied by hand, it is most important that a non-toxic fluid be used, and one that does not irritate the eyes and mucous membrane of the worker. When employing a liquid flux, it is quite usual for a flux to be applied to the joint to be soldered using a brush. Under such conditions, it is almost unavoidable that some of this flux drips into the cavity of the joint, resulting in a potential source of the unwanted moisture.

It was found that if "Freon-113," trichlorotrifluoroethane (B. P. 117.6° F. at 760 mm.) was added to a liquid flux, a liquid flux having very superior characteristics was thereby obtained. By using this improved liquid flux, which possesses the quality of a more desirable surface tension characteristic than ordinary liquid fluxes, it is possible to employ a liquid flux for the soldering of evaporator tubes without the resulting disadvantage of moisture in the evaporator tubes in excess of the specifications of manufacturers. The specifications of many corporations stipulate that the moisture content inside the tubes of an evaporator must not be higher than 6 mg./ft.$^2$ internal surface area of an evaporator.

A comparison of the amount of moisture in a number of evaporators (Westinghouse Model NU 12) after the soldering operation is shown below. The tubes of five evaporators were soldered using ordinary liquid flux and then the tubes of five more evaporators were soldered using liquid flux mixed with "Freon." The results are as follows:

Liquid flux

| Evaporator No: | Moisture, Mg. |
| --- | --- |
| 1 | 44 |
| 2 | 64 |
| 3 | 83 |
| 4 | 82 |
| 5 | 32 |

Liquid flux—Freon

| | |
| --- | --- |
| 6 | 9.3 |
| 7 | 8.6 |
| 8 | 6.5 |
| 9 | 3.0 |
| 10 | 5.6 |

There are at least six refrigerants known as "Freon," and of these, "Freon 113" has been found to be most satisfactory for use with commercial liquid flux. As to the liquid flux used, "Kwickflux" (trade name), a flux containing boric acid as a principal ingredient, and manufactured under one or more of Patent Nos. 2,174,551; 2,196,853; and 2,452,995 has been found to be most suitable.

The following is an example of the proportions of ingredients which may be employed to make satisfactory flux compositions, it being understood that this example is in no way limitative:

Example

| | |
| --- | --- |
| Freon-113 | gallons__ ½ |
| Kwickflux | pounds__ 15 |

It is to be realized that "Freon" is stable and inert, and insoluble in water. In order to obtain a suitable liquid flux according to the above example, it is necessary that the "Freon" be added in small portions to the liquid flux, under good agitation. If the liquid flux is placed in a container and the "Freon-113" added in small portions under good agitation with a motor driven agitator, the two compounds can be suitably blended into a mechanical mixture.

By the use of this improved flux containing "Freon," the joints in evaporator tubes can be quickly and easily soldered together, with the moisture content in the evaporator tubes being kept to an absolute minimum. Such a flux can be applied very rapidly by a skilled worker and is absolutely odorless, and does not in any way adversely affect the health of the worker, for it is nonirritating and nontoxic.

As various possible embodiments might be made of the above invention, and as various changes might be made in the embodiments above set forth, it is to be understood that all matter herein set forth is to be interpreted as illustrative and not in a limiting sense.

We claim:

1. The method of avoiding the introduction of moisture into an evaporator tube or the like during soldering of the tube joints with a semi-liquid aqueous flux comprising mixing a fluorinated hydrocarbon refrigerant with the aqueous flux material and using said mixture as the flux during soldering of the tube joints.

2. The method of claim 1 wherein the fluorinated hydrocarbon refrigerant is trichlorotrifluoroethane.

3. In a flux material for use in soldering evaporator tubes wherein it is desirable to avoid the introduction of moisture into the tubes during soldering of the tube joints, the combination of a liquid flux whose essential ingredient is boric acid, and a fluorinated hydrocarbon refrigerant.

4. The combination as defined in claim 3 in which the refrigerant is trichlorotrifluoroethane.

5. In a flux material for use in soldering evaporator tubes wherein it is desirable to avoid the introduction of moisture into the tubes during soldering of the tube joints, the combination of a liquid flux comprising a substantial proportion of water and a fluorinated hydrocarbon refrigerant.

References Cited in the file of this patent

UNITED STATES PATENTS

| | | |
|---|---|---|
| 1,838,370 | Dean et al. | Dec. 29, 1931 |
| 2,155,307 | Hagemann et al. | Apr. 18, 1939 |
| 2,330,904 | Miller | Oct. 5, 1943 |
| 2,664,370 | Snell et al. | Dec. 29, 1953 |

OTHER REFERENCES

The Iron Age, December 30, 1948, page 33.